United States Patent
Yang et al.

(10) Patent No.: US 9,904,324 B2
(45) Date of Patent: Feb. 27, 2018

(54) SECONDARY SCREEN STRUCTURE OF DISPLAY DEVICE, DOUBLE-SIDED DISPLAY DEVICE AND METHOD FOR MANUFACTURING E-PAPER SCREEN

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jiuxia Yang, Beijing (CN); Jiantao Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 92 days.

(21) Appl. No.: 14/532,156

(22) Filed: Nov. 4, 2014

(65) Prior Publication Data

US 2015/0370521 A1    Dec. 24, 2015

(30) Foreign Application Priority Data

Jun. 18, 2014    (CN) .......................... 2014 1 0274099

(51) Int. Cl.
*G06F 1/16* (2006.01)
*G06F 3/041* (2006.01)
(Continued)

(52) U.S. Cl.
CPC ...... *G06F 1/1647* (2013.01); *G02F 1/133305* (2013.01); *G06F 1/1626* (2013.01);
(Continued)

(58) Field of Classification Search
CPC .... G06F 3/0416; G06F 3/0412; G06F 3/0488; G06F 3/041; G06F 3/1423; G06F 3/1438;
(Continued)

(56) References Cited

U.S. PATENT DOCUMENTS 6,819,309 B1* 11/2004 Kishi ................... G02F 1/1333
345/107
8,305,354 B2* 11/2012 Lin ....................... G06F 1/1626
345/1.1
(Continued)

FOREIGN PATENT DOCUMENTS

CN    2881703 Y    3/2007
CN    1975546 A    6/2007
(Continued)

OTHER PUBLICATIONS

First Office Action regarding Chinese application No. 201410274099.4, dated Apr. 1, 2016. Translation provided by Dragon Intellectual Property Law Firm.
(Continued)

*Primary Examiner* — Dismery Mercedes
(74) *Attorney, Agent, or Firm* — Harness, Dickey & Pierce, P.L.C.

(57) ABSTRACT

The present disclosure discloses a secondary screen structure of a display device, a double-sided display device and a method for manufacturing an e-paper screen. The secondary screen structure of the display device includes an e-paper screen and a secondary screen driving unit connected with each other. The e-paper screen includes an e-paper layer, a touch control unit layer and a solar energy unit layer. The e-paper layer is controlled by the secondary screen driving unit to display. The touch control unit layer may input instructions to the secondary screen driving unit. The solar energy unit layer may supply power for the e-paper layer.

7 Claims, 3 Drawing Sheets

(51) Int. Cl.
  *G06F 3/14* (2006.01)
  *G02F 1/1333* (2006.01)
  *G09G 5/00* (2006.01)
  *G09G 3/34* (2006.01)

(52) U.S. Cl.
  CPC ............ *G06F 1/1652* (2013.01); *G06F 3/041* (2013.01); *G06F 3/1423* (2013.01); *G09G 3/344* (2013.01); *G02F 1/13338* (2013.01); *G06F 2203/04103* (2013.01); *G09G 5/003* (2013.01); *G09G 2300/023* (2013.01); *G09G 2380/14* (2013.01); *Y10T 29/49131* (2015.01)

(58) Field of Classification Search
  CPC . G06F 2203/04103; G06F 2203/04102; G06F 1/1652; G06F 1/1647; G06F 1/1654; G02F 1/1626; G02F 1/13338; G02F 1/13439; G02F 1/133308; G02F 1/1333; G02F 1/133305; G02F 1/167; G09G 2354/00; G09G 2300/0408; G09G 3/344; G09G 2380/02; G09G 5/003; G09G 2300/023
  See application file for complete search history.

(56) References Cited

U.S. PATENT DOCUMENTS

| | | | | |
|---|---|---|---|---|
| 8,754,859 B2 * | 6/2014 | Gates | ................... | G06F 3/0412 250/208.1 |
| 8,943,427 B2 * | 1/2015 | Heo | ...................... | G06F 1/1647 715/768 |
| 9,081,444 B2 * | 7/2015 | Hong | ....................... | G06F 3/042 |
| 9,136,286 B2 * | 9/2015 | Okamoto | ................ | G02F 1/167 |
| 9,495,687 B2 * | 11/2016 | Lee | ........................ | G06Q 30/02 |
| 2005/0225686 A1 | 10/2005 | Brummack et al. | | |
| 2007/0035473 A1 * | 2/2007 | Yamazaki | ........... | G02F 1/13318 345/4 |
| 2009/0082067 A1 * | 3/2009 | Song | ................. | G02F 1/133308 455/566 |
| 2009/0231252 A1 * | 9/2009 | Maegawa | ............... | G06F 21/84 345/87 |
| 2010/0048252 A1 * | 2/2010 | Kang | ................ | H04M 1/72522 455/566 |
| 2010/0302194 A1 * | 12/2010 | Park | ...................... | G06F 1/1675 345/173 |
| 2011/0032223 A1 * | 2/2011 | Okamoto | ................ | G02F 1/167 345/204 |
| 2011/0039603 A1 * | 2/2011 | Kim | ...................... | G06F 1/1632 455/566 |
| 2011/0124376 A1 * | 5/2011 | Kim | ...................... | G06F 1/1626 455/566 |
| 2011/0157036 A1 * | 6/2011 | Yang | ..................... | G06F 1/1624 345/173 |
| 2011/0181576 A1 * | 7/2011 | Pan | ..................... | G02F 1/13338 345/211 |
| 2011/0234513 A1 * | 9/2011 | Pan | ........................ | G02F 1/167 345/173 |
| 2011/0254824 A1 * | 10/2011 | Chuang | .................. | G09G 3/344 345/212 |
| 2011/0310459 A1 * | 12/2011 | Gates | ..................... | G06F 3/0412 359/296 |
| 2012/0032972 A1 * | 2/2012 | Hwang | ................. | G06F 3/0488 345/592 |
| 2013/0285881 A1 * | 10/2013 | Loo | ....................... | G06F 3/1423 345/1.1 |
| 2014/0002365 A1 * | 1/2014 | Ackley | .................. | G09G 5/006 345/168 |
| 2014/0049449 A1 * | 2/2014 | Park | ......................... | G09G 5/00 345/1.3 |
| 2015/0227336 A1 * | 8/2015 | Kim | ....................... | A45C 11/00 345/173 |

FOREIGN PATENT DOCUMENTS

| | | |
|---|---|---|
| CN | 100374934 C | 3/2008 |
| CN | 101739906 A | 6/2010 |
| CN | 101853642 A | 10/2010 |
| CN | 101997976 A | 3/2011 |
| CN | 202003515 U | 10/2011 |
| CN | 202058064 U | 11/2011 |
| CN | 102402900 A | 4/2012 |
| CN | 203896400 U | 10/2014 |

OTHER PUBLICATIONS

Second Office Action regarding Chinese application No. 201410274099.4, dated Sep. 13, 2016. Translation provided by Dragon Intellectual Property Law Firm.

* cited by examiner

SECONDARY SCREEN STRUCTURE OF DISPLAY DEVICE, DOUBLE-SIDED DISPLAY DEVICE AND METHOD FOR MANUFACTURING E-PAPER SCREEN

CROSS-REFERENCE TO RELATED APPLICATION

This application claims priority to Chinese Patent Application No. 201410274099.4 filed on Jun. 18, 2014, the disclosures of which are incorporated in its entirety by reference herein.

TECHNICAL FIELD

The present disclosure relates to a technical field of the electronic display technology, particularly to a secondary screen structure of a display device, a double-sided display device and a method for manufacturing an e-paper screen.

BACKGROUND

Currently, in the technical field of the electronic display technology, especially in a display screen of a mobile phone, all information is displayed on a primary screen of the mobile phone in existing technologies. There are few mobile phones provided with a secondary screen structure on their back. However, in a research and development of the field, it has been focused on double-sided display mobile phone. Both Microsoft and Samsung have made design and development plans for displaying on double sides of the mobile phone. Samsung has released a world's first double-sided LCD product which is applied in a mobile phone.

Chinese Patent No. CN2881703Y discloses a double-sided LCD display, which mainly provides a reflective monochrome display and an active light emitting display between multiple substrates. Chinese Patent Publication No. CN1975546A and CN100374934C also disclose display devices, respectively, n which displaying on double-sides may also be achieved. However, the existing double-sided display devices are liquid crystal displays. With respect to the mobile phone display, if a liquid crystal display is used in a secondary display, on one hand, power consumption is large; on the other hand, a secondary screen structure of the mobile phone is complicated and bulky.

SUMMARY

An object of the present disclosure is to provide a secondary screen structure of a display device, a double-sided display device and a method for manufacturing an e-paper screen which may achieve displaying on double-sides of mobile phones and other devices, and solve the problems existed in the existing secondary screen display of mobile phones, such as large power consumption, complicated structure and bulky.

To solve the above problem, one aspect of the present disclosure provides a secondary screen structure of a display device, including an e-paper screen and a secondary screen driving unit connected with each other. The e-paper screen includes an e-paper layer controlled by the secondary screen driving unit to display, a touch control unit layer configured to touch control and input instructions to the e-paper layer, and a solar energy unit layer configured to supply power for the e-paper layer via the secondary screen driving unit; the e-paper layer is attached to a back of the display device and connected with the secondary screen driving unit; the touch control unit layer and the solar energy unit layer are provided on the e-paper layer; the touch control unit layer and the solar energy unit layer are electrically connected with the e-paper layer via the secondary screen driving unit.

Further, the secondary screen structure further includes a power determination unit connected between the solar energy unit layer and the secondary screen driving unit.

Further, the solar energy unit layer is attached to an outward surface of the e-paper layer; the touch control unit layer is attached to an outward surface of the solar energy unit layer.

Further, the touch control unit layer is attached to an outward surface of the e-paper layer, and the solar energy unit layer is attached to an outward surface of the touch control unit layer.

Further, the e-paper layer is connected with a wireless communication module of the display device.

Further, the display device is a mobile phone.

Another aspect of the present disclosure provides a double-sided display device, including a primary screen structure provided on a front of the double-sided display device and the above secondary screen structure provided on a back of the double-sided display device.

Further, a primary screen driving unit of the primary screen structure and the secondary screen driving unit of the secondary screen structure are provided on opposite sides of a same glass substrate or a same flexible-material substrate, respectively.

Further, the double-sided display device further includes a primary-secondary screen switch button provided on a lateral side of the double-sided display device and a switch button control unit provided in the double-sided display device; wherein the primary-secondary screen switch button, the primary screen driving unit and the secondary screen driving unit are connected with the switch button control unit.

Further, a primary screen driving unit of the primary screen structure and the secondary screen driving unit of the secondary screen structure are provided on two substrates in the double-sided display device, respectively.

Further, the double-sided display device further includes a primary-secondary screen switch button provided on a lateral side of the double-sided display device and a switch button control unit provided in the double-sided display device; wherein the primary-secondary screen switch button, the primary screen driving unit and the secondary screen driving unit are connected with the switch button control unit.

Further, the primary screen structure and the secondary screen structure are connected with a storage unit in the double-sided display device, to read data stored in the storage unit.

Further, the double-sided display device further includes a wireless communication module; wherein the primary screen structure and the secondary screen structure are connected with the wireless communication module.

Further, the double-sided display device further includes a battery; wherein the secondary screen structure includes a power determination unit; the power determination unit controls the secondary screen driving unit to connect with one of the battery and a solar energy unit layer of the secondary screen structure.

Further, the double-sided display device further includes a groove provided on the back of the double-sided display device; wherein the secondary screen structure is disposed in the groove.

Further, the double-sided display device is a double-sided display mobile phone.

The present disclosure further provides a method for manufacturing an e-paper screen applied in a secondary screen structure of a display device, including steps of: attaching an e-paper layer, a solar energy unit layer and a touch control unit layer to a back of the display device; and connecting the e-paper layer with the secondary screen driving unit; wherein the touch control unit layer and the solar energy unit layer are provided on the e-paper layer; the touch control unit layer and the solar energy unit layer are electrically connected with the e-paper layer via the secondary screen driving unit.

Further, the attaching an e-paper layer, a solar energy unit layer and a touch control unit layer to a back of the display device includes: S1, attaching the e-paper layer to the back of the display device, and providing the solar energy unit layer on a surface of the e-paper layer; and S2, coating a dielectric coating on a surface of the solar energy unit layer, and then forming a carbon nanotube touch control unit layer on a surface of the dielectric coating by using a carbon nanotube film drawing process.

Further, the attaching an e-paper layer, a solar energy unit layer and a touch control unit layer to a back of the display device includes: S1, attaching the e-paper layer to the back of the display device, and forming a carbon nanotube touch control unit layer on a surface of the e-paper layer by using a film drawing process; and S2, coating a dielectric coating on a surface of the carbon nanotube touch control unit layer, and then providing the solar energy unit layer on a surface of the dielectric coating.

Further, the attaching an e-paper layer to a back of the display device includes: forming isolation walls of the e-paper layer on a surface of the secondary screen driving unit by a lithographic process; injecting electronic ink into chambers between the isolation walls to form electrophoresis units; attaching a transparent organic protecting layer to a surface of the e-paper layer.

The above-described technical solution of the present disclosure has the following advantages: in the secondary screen structure of the display device, the double-sided display device such as the double-sided display mobile phone and the method for manufacturing the e-paper screen provided in the present disclosure, the e-paper layer is connected with the secondary screen driving unit; the secondary screen driving unit drives and controls the display of the e-paper; the touch control unit layer may input instructions to the secondary screen driving unit; the solar energy unit layer may provide power for the e-paper layer. Since the e-paper layer is used for a secondary screen display, thus, the power consumption of the mobile phone secondary screen structure becomes smaller in addition to achieving the double-sided displaying. Further, since the thickness of the e-paper is small, thus, the mobile phone secondary screen structure becomes simply and is easy to use.

DETAILED DESCRIPTION

Specific implementation of the present disclosure will be further described below in detail in conjunction with the accompanying drawings and embodiments. The following embodiments are used to illustrate the present disclosure, but not to limit the scope of the present disclosure.

Figure 1:
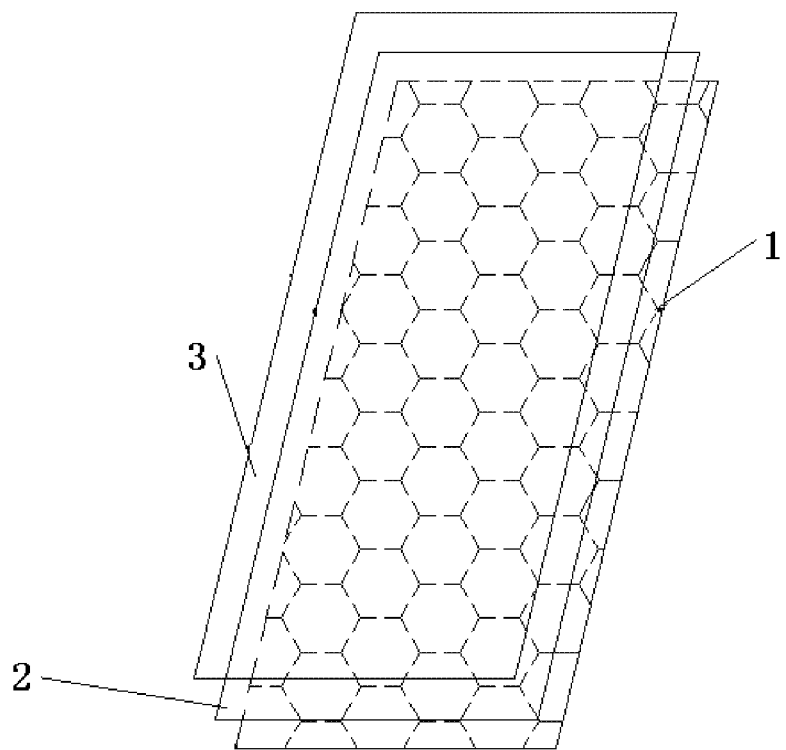
FIG. 1 is a stereo diagram showing a secondary screen structure of a display device of one embodiment of the present disclosure.
Figure 2:
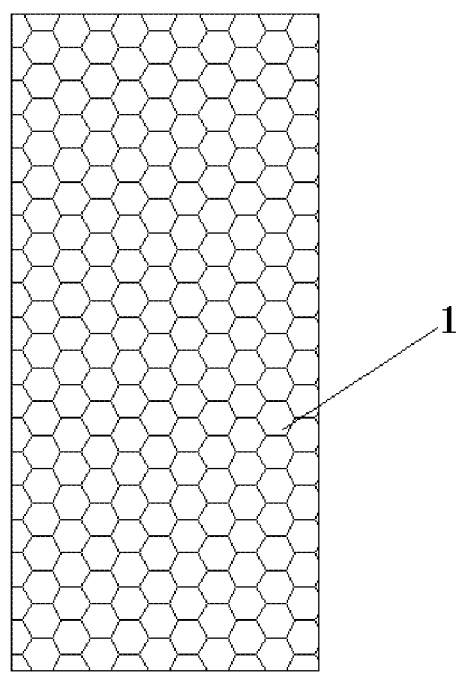
FIG. 2 is a diagram showing an e-paper layer in a secondary screen structure of a display device of one embodiment of the present disclosure.
Figure 3:
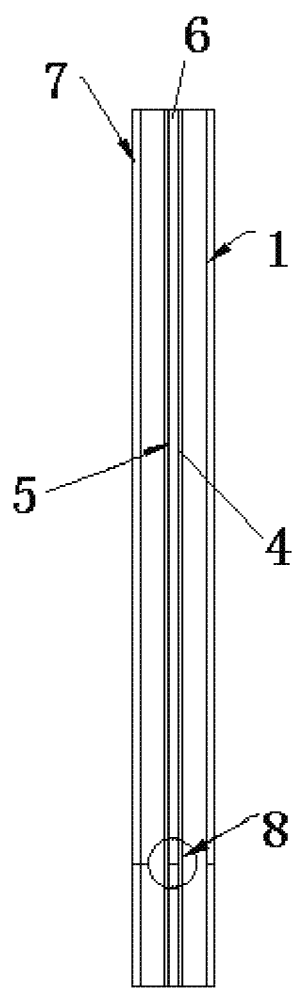
FIG. 3 is a stereo diagram showing a double-sided display device of one embodiment of the present disclosure.

The present disclosure provides a secondary screen structure of a display device, as shown in FIGS. 1, 2 and 3. The secondary screen structure may be a secondary screen structure of a mobile phone, and also may be a secondary screen structure of a tablet computer or other display devices. The secondary screen structure of the display device will be described below by taking the secondary screen structure being applied in a mobile phone as an example. The secondary screen structure being applied in a mobile phone may also be referred as "mobile phone secondary screen structure".

The mobile phone secondary screen structure includes an e-paper screen and a secondary screen driving unit 4 which are connected with each other. The e-paper screen includes an e-paper layer 1, a touch control unit layer 2, and a solar energy unit layer 3. The e-paper layer 1 is attached to a back of a mobile phone and connected with the secondary screen driving unit 4. The touch control unit layer 2 and the solar energy unit layer 3 are provided on the e-paper layer 1. The touch control unit layer 2 and the solar energy unit layer 3 are electrically connected with the e-paper layer 1 via the secondary screen driving unit 4. Specifically, the touch control unit layer 2 is attached to an outward surface of the e-paper layer 1, and the solar energy unit layer 3 is attached to an outward surface of the touch control unit layer 2. Of course, positions of the touch control unit layer 2 and the solar energy unit layer 3 may be interchanged, that is, the solar energy unit layer 3 is attached to the outward surface of the e-paper layer 1, and the touch control unit layer 2 is attached to an outward surface of the solar energy unit layer 3. Of course, in one embodiment of the present disclosure, the secondary screen driving unit 4 may be connected with a power supply (such as a battery) in the mobile phone.

Figure 5:
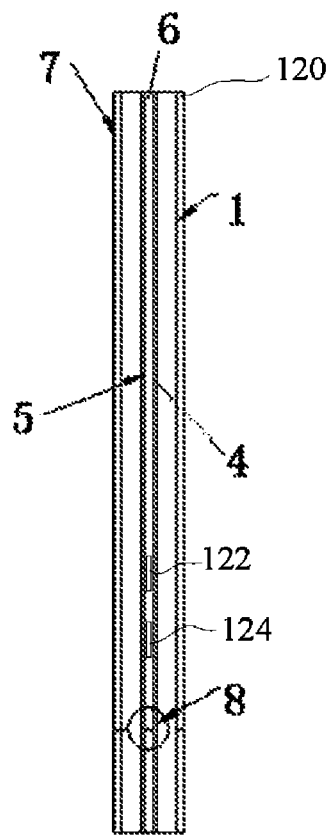
FIG. 5 is a stereo diagram showing a double-sided display device of one embodiment of the present disclosure.

The secondary screen driving unit 4 may be an IC driving chip, and may be provided on a glass substrate 6 within the mobile phone, to control the e-paper screen. The e-paper layer 1 may have a thickness of hundreds micrometers. The e-paper may be directly attached to a back cover of the mobile phone, or may be installed on the mobile phone in other connection manners. For example, as shown in FIG. 5, the back cover of the mobile phone may be designed to have a groove 120, and then the e-paper may be embedded within the groove 120. In one embodiment, the latter connection manner may be selected, in this manner, wires of the e-paper may be disposed in the groove 120 so as to facilitate the e-paper to communicate with the mobile phone and read or write data. The solar energy unit layer 3 may adopt an existing solar cell structure.

Figure 4:
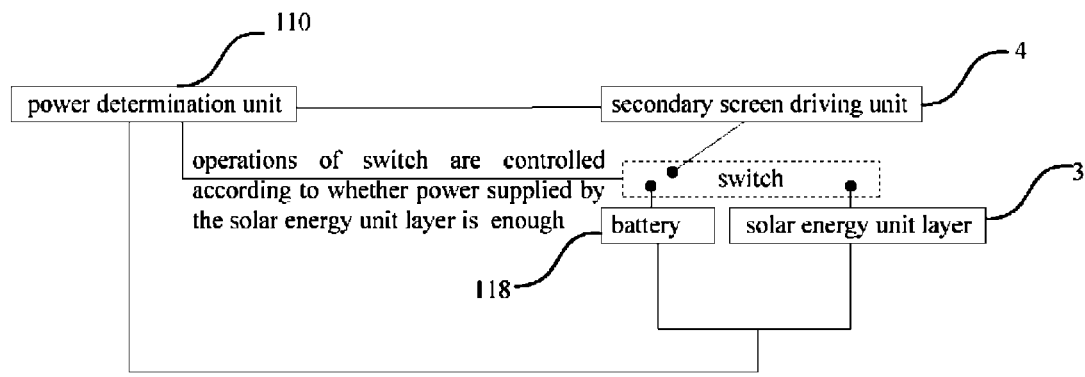
FIG. 4 is a diagram showing a power determination unit connected between a solar energy unit layer and a secondary screen driving unit.

A power determination unit 110 may also be connected between the solar energy unit layer 3 and the secondary screen driving unit 4, as shown in FIG. 4. When power supplied by the solar energy unit layer 3 is not enough, a corresponding secondary screen control system in the mobile phone, such as the power determination unit 110, may automatically switch to a mode in which the battery 118 of the mobile phone supplies power for the mobile phone secondary screen structure.

In the above technical solution, the e-paper layer 1 is attached to the back of mobile phone and connected with the secondary screen driving unit 4, and controlled by the secondary screen driving unit 4. Touch control and instruction input to the e-paper layer 1 may be performed by the touch control unit layer 2. The solar energy unit layer 3 may supply power for the e-paper layer 1 via the secondary screen driving unit 4. Since the e-paper layer 1 has characteristics of low power consumption and image holding when power is off, thus, by using the e-paper layer to display, the mobile phone secondary screen structure has characteristics of simple structure, ease to use and low power consumption. In general, the power supplied by the solar energy unit layer 3 may meet the need of displaying and maintaining background images of the mobile phone, or, photos or animations stored in a memory of the mobile phone. When the power supplied by the solar energy unit layer 3 is not enough, the power supply of the mobile phone may be used. The mobile phone secondary screen structure may be used to browse pictures, send and receive text messages, read e-books and other related functions, the power consumption may be reduced and the endurance of the display device may be extended. Meanwhile, the solar energy unit layer 3 may be used to charge the mobile phone secondary screen, so as to improve the endurance of mobile phone secondary screen.

Specifically, in one embodiment, when manufacturing the e-paper layer 1, an isolation wall of the e-paper layer 1 is first formed on a surface of the secondary screen driving unit 4 by a lithographic process; and then an electronic ink is injected into a corresponding chamber to form an electrophoresis unit. Meanwhile, in order to prevent leakage of the electronic ink, a transparent organic protecting layer is attached to an entire surface of the e-paper layer 1, by using a process of combining a thimble mold and UV light. The lithographic process of forming the isolation wall structure of the e-paper layer 1 includes: coating a UV material layer, pre-curing, UV exposing, developing and post-baking; then the isolation wall structure of the e-paper layer 1 is formed.

Further, as shown in FIG. 5, the e-paper layer 1 may be connected with a wireless communication module 122 of a mobile phone primary screen structure, that is, the mobile phone secondary screen structure and the mobile phone primary screen structure may share the same wireless communication module 122, such as Bluetooth or infrared module. For example, a transmitter-receiver module corresponding to the e-paper layer 1 may be provided in the mobile phone. Such a design may increase modes of usage of the e-paper. For example, the e-paper may be separated from a housing of the mobile phone and used as a display device separately, so as to improve users experience.

One embodiment of the present disclosure further provides a double-sided display device. The double-sided display device will be described below by taking a double-sided display mobile phone as an example.

In one embodiment, a double-sided display mobile phone includes a mobile phone primary screen structure 7 provided on a front of the mobile phone and the above mobile phone secondary screen structure provided on a back of the mobile phone. A primary screen driving unit 5 of the mobile phone primary screen structure 7 and the secondary screen driving unit 4 of the mobile phone secondary screen structure are provided on opposite sides of the same glass substrate 6, to independently control the mobile phone primary screen structure 7 and the mobile phone secondary screen structure. The glass substrate 6 may also be replaced with a flexible-material substrate.

Of course, the primary screen driving unit 5 of the mobile phone primary screen structure 7 and the secondary screen driving unit 4 of the mobile phone secondary screen structure may also be provided on two different substrates in the mobile phone.

Further, the double-sided display mobile phone also includes a primary-secondary screen switch button 8 provided on a lateral side of the mobile phone and a switch button control unit provided in the mobile phone. The primary-secondary screen switch button 8, the primary screen driving unit 5 and the secondary screen driving unit 4 are all connected with the switch button control unit. Selection of the primary screen and the secondary screen is achieved by operating the primary-secondary screen switch button 8. Specifically, whether the primary screen works or the secondary screen works may be distinguished by the number of times of continuously pressing the primary-secondary screen switch button 8. For example, when the primary-secondary screen switch button 8 is pressed once, the primary screen works; when the primary-secondary screen switch button 8 is pressed twice, the secondary screen works. Of course, other ways of switching may also be set.

Switch between the primary screen and the secondary screen may also be achieved by operating the primary-secondary screen switch button 8. Specifically, when one of the primary screen and the secondary screen is in work and there is a need to switch to the other one of the primary screen and the secondary screen, the switch between the screen in work and the other screen may be achieved by sliding up or down the primary-secondary screen switch button 8 on the lateral side of the mobile phone. For example, if there is need to switch to the primary screen when the secondary screen is in work, after sliding up or down the primary-secondary screen switch button 8 on the lateral side of the mobile phone, the secondary screen is changed into a standby mode, while the primary screen is opened and changed into a working mode.

Further, the mobile phone primary screen structure 7 and the mobile phone secondary screen structure are connected with a storage unit 124 of the mobile phone, as shown in FIG. 5, so as to read data stored in the storage unit 124 of the mobile phone. In one embodiment, the mobile phone primary screen structure 7 and mobile phone secondary screen structure share the storage unit 124 of the mobile phone, and may read the data stored in the storage unit 124 of the mobile phone separately.

One embodiment of the present disclosure also provides a method for manufacturing an e-paper screen which may be applied in the above secondary screen structure of the display device. The method includes steps of:

attaching the e-paper layer, the solar energy unit layer and the touch control unit layer to the back of the display device; and connecting the e-paper layer with the secondary screen driving unit.

In one embodiment, the attaching the e-paper layer, the solar energy unit layer and the touch control unit layer to the back of the display device includes:

S1, attaching the e-paper layer to the back of the display device, and providing the solar energy unit layer 3 on a surface of the e-paper layer 1;

S2, coating a dielectric coating on a surface of the solar energy unit layer 3, and then forming a carbon nanotube touch control unit layer 2 on a surface of the dielectric coating by using a carbon nanotube film drawing process.

In another embodiment, the attaching the e-paper layer, the solar energy unit layer and the touch control unit layer to the back of the display device includes:

S1, attaching the e-paper layer to the back of the display device, and forming a carbon nanotube touch control unit layer 2 on a surface of the e-paper layer 1 by using a film drawing process;

S2, coating a dielectric coating on a surface of the carbon nanotube touch control unit layer 2, and then providing the solar energy unit layer 3 on a surface of the dielectric coating.

In one embodiment, the attaching the e-paper layer to the back of the display device includes:

forming isolation walls of the e-paper layer by a lithographic process on a surface of the secondary screen driving unit;

injecting electronic ink into chambers between the isolation walls to form electrophoresis units;

attaching a transparent organic protecting layer to a surface of the e-paper layer.

An e-paper screen of a mobile phone secondary screen structure may be manufactured by the method for manufacturing an e-paper screen of one embodiment of the present disclosure. The e-paper screen may be powered by solar energy and may be controlled by touch.

When using the mobile phone secondary screen structure of one embodiment of the present disclosure, the mobile phone secondary screen may be selected to display through the primary-secondary screen switch button 8. Since the e-paper is connected with the secondary screen driving unit 4, thus the secondary screen driving unit 4 controls the display of the e-paper layer 1. The e-paper layer 1 may display normally under control of instructions from the touch control unit layer.

The mobile phone secondary screen structure of the present disclosure may also be used as a decorative background of the mobile phone, in addition to being used for normally displaying. Currently, in order to make the mobile phone have a good appearance, a background pattern or an animation is usually provided on a display interface of the mobile phone. But such a display mode has high power consumption, and a mobile phone user often replaces mobile phone back covers to change patterns of the back cover. However, using the mobile phone secondary screen structure of the present disclosure to display the background pattern or the animation may save power and avoid resource waste caused by replacement of the mobile phone back covers. Specifically, when displaying normally and being used as a background, the mobile phone secondary screen structure gets through following process: prompting a user to choose whether the e-paper layer 1 is used for displaying or used as a background; if the user chooses to use the e-paper layer 1 for displaying, keeping the e-paper being in communication connection with the mobile phone and displaying normally; if the user chooses to use the e-paper layer 1 as a background, prompting the user to select a background image; after the user selects the background image, sending information of the background image selected by the user to the e-paper for displaying; finally, cutting off the connection between the e-paper and the mobile phone.

In summary, in the secondary screen structure of the display device, such as the mobile phone secondary screen structure, the double-sided display device such as the double-sided display mobile phone and the method for manufacturing the e-paper screen provided in the present disclosure, the e-paper layer 1 is connected with the secondary screen driving unit 4; the secondary screen driving unit 4 drives and controls the display of the e-paper; the touch control unit layer 2 may input instructions to the secondary screen driving unit 4; the solar energy unit layer 3 may provide power for the e-paper layer 1. Since the e-paper layer 1 is used for a secondary screen display, thus, the power consumption of the mobile phone secondary screen structure becomes smaller in addition to achieving the double-sided displaying. Further, since the thickness of the e-paper is small, thus, the mobile phone secondary screen structure becomes simply and is easy to use. In addition, the primary-secondary screen switch button 8 is set on the lateral side of the mobile phone, so that when being used, the double-sided display device such as the double-sided display mobile phone of the present disclosure may switch between the primary screen and the secondary screen, thereby making the use of the mobile phone more energy-efficient and more flexible.

The above are only exemplary embodiments of the present disclosure. It should be noted that modifications and variations may be made by those of ordinary skill in the art without departing from the technical principle of the present disclosure. These modifications and variations should also be considered to fall within the scope of protection of the present disclosure.

What is claimed is:

1. A double-sided display device comprising a primary screen structure provided on a front of the double-sided display device and a secondary screen structure on a back of the double-sided display device; the primary screen structure comprising a primary screen driving unit;

wherein the secondary screen structure comprises an e-paper screen and a secondary screen driving unit in communication with the e-paper screen;

the e-paper screen comprises an e-paper layer controlled by the secondary screen driving unit to display, a touch control unit layer configured to touch control and input instructions to the e-paper layer, and a solar energy unit layer configured to supply power for the e-paper layer via the secondary screen driving unit;

the e-paper layer is removably attached to a back of the display device and connected with the secondary screen driving unit when the e-paper layer is attached to the back of the display device;

the touch control unit layer and the solar energy unit layer are provided on the e-paper layer;

the touch control unit layer and the solar energy unit layer are electrically connected with the e-paper layer via the secondary screen driving unit when the e-paper layer is attached to the back of the display device; and wherein the double-sided display device further comprises a glass substrate having a first side and an opposite second side, the primary screen driving unit of the primary screen structure being on the first side of the glass substrate, and the secondary screen driving unit being provided on the second side of the glass substrate.

2. The double-sided display device according to claim 1, further comprising a primary-secondary screen switch button provided on a lateral side of the double-sided display device and a switch button control unit provided in the double-sided display device; wherein the primary-secondary screen switch button, the primary screen driving unit and the secondary screen driving unit are connected with the switch button control unit.

3. The double-sided display device according to claim 1, further comprising a wireless communication module; wherein the primary screen structure and the secondary screen structure are connected with the wireless communication module.

4. The double-sided display device according to claim 1, further comprising a battery;
- wherein the secondary screen structure comprises a power determination unit;
- the power determination unit controls the secondary screen driving unit to connect with one of the battery and a solar energy unit layer of the secondary screen structure.

5. The double-sided display device according to claim 1, further comprising a groove provided on the back of the double-sided display device; wherein the secondary screen structure is disposed in the groove.

6. The double-sided display device according to claim 1, wherein the double-sided display device is a double-sided display mobile phone.

7. The double-sided display device according to claim 1, wherein the primary screen driving unit is independent from the secondary screen driving unit.

\* \* \* \* \*